(12) United States Patent
Glugla et al.

(10) Patent No.: US 11,118,497 B2
(45) Date of Patent: Sep. 14, 2021

(54) SYSTEMS AND METHODS FOR FOULING REDUCTION IN A PRE-CHAMBER

(71) Applicant: Ford Global Technologies, LLC, Dearborn, MI (US)

(72) Inventors: Chris Paul Glugla, Macomb, MI (US); Michael Howard Shelby, Plymouth, MI (US); Michael Damian Czekala, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/788,485

(22) Filed: Feb. 12, 2020

(65) Prior Publication Data
US 2021/0246823 A1  Aug. 12, 2021

(51) Int. Cl.
| | | |
|---|---|---|
| *F02B 19/12* | (2006.01) | |
| *F02D 41/14* | (2006.01) | |
| *F02D 41/06* | (2006.01) | |
| *F02D 41/40* | (2006.01) | |
| *F02D 13/02* | (2006.01) | |

(52) U.S. Cl.
CPC .......... *F02B 19/12* (2013.01); *F02D 13/0215* (2013.01); *F02D 41/064* (2013.01); *F02D 41/1466* (2013.01); *F02D 41/402* (2013.01); *F02D 2200/101* (2013.01)

(58) Field of Classification Search
CPC .. F02B 19/12; F02D 13/0215; F02D 41/1466; F02D 41/064; F02D 41/402; F02D 2200/101
See application file for complete search history.

(56) References Cited

U.S. PATENT DOCUMENTS

| | | | |
|---|---|---|---|
| 4,901,687 A | 2/1990 | Jones | |
| 6,293,095 B1 | 9/2001 | Yamamoto et al. | |
| 8,146,555 B2 | 4/2012 | Solomon et al. | |
| 8,925,518 B1* | 1/2015 | Riley | F02B 19/1057 |
| | | | 123/261 |
| 9,353,674 B2 | 5/2016 | Bunce et al. | |
| 9,909,523 B1* | 3/2018 | Glugla | F02D 41/062 |
| 10,018,104 B2 | 7/2018 | Grover, Jr. et al. | |
| 10,400,696 B2 | 9/2019 | Blaxill et al. | |
| 2007/0215130 A1* | 9/2007 | Shelby | F02D 19/084 |
| | | | 123/637 |
| 2011/0251743 A1* | 10/2011 | Hu | F02B 29/0443 |
| | | | 701/22 |
| 2015/0075492 A1* | 3/2015 | Glugla | F02D 41/0027 |
| | | | 123/349 |
| 2018/0094597 A1* | 4/2018 | Guo | F02D 41/22 |
| 2018/0135506 A1* | 5/2018 | Grover, Jr. | F02B 19/12 |

* cited by examiner

*Primary Examiner* — Carl C Staubach
(74) *Attorney, Agent, or Firm* — Geoffrey Brumbaugh; McCoy Russell LLP

(57) ABSTRACT

Methods and systems are provided for combusting an air-fuel mixture in a pre-chamber of a cylinder during an exhaust stroke of the cylinder responsive to fouling of the pre-chamber. In one example, a method may include injecting air into the pre-chamber during the exhaust stroke, injecting fuel into the pre-chamber during the exhaust stroke, and actuating a pre-chamber spark plug in order to combust the air-fuel mixture during the exhaust stroke. In this way, a temperature of the pre-chamber may be increased, which may decrease a soot load of one of a pre-chamber air-injector, a pre-chamber fuel injector, and the pre-chamber spark plug.

8 Claims, 5 Drawing Sheets

SYSTEMS AND METHODS FOR FOULING REDUCTION IN A PRE-CHAMBER

FIELD

The present description relates generally to methods and systems for reducing spark plug fouling and/or injector fouling in a pre-chamber ignition system of an engine.

BACKGROUND/SUMMARY

An internal combustion engine combusts an air-fuel mixture within cylinders to produce torque, which may be used to propel a vehicle. In some such engines, an ignition spark is used to ignite the air-fuel mixture within each cylinder during a compression stroke. For example, in traditional spark-ignition engines, each cylinder includes a spark plug for directly igniting the air-fuel mixture within the cylinder. In other examples, the air-fuel mixture within the cylinder may be ignited by jets of hot gas and flame from a pre-combustion chamber, referred to herein as a "pre-chamber." The pre-chamber may be walled chamber located in a clearance volume of the cylinder and may include a spark plug, an $O_2$ or air injector, and a fuel injector. During engine operation, a first air-fuel mixture is introduced into the pre-chamber, and a second air-fuel mixture is introduced into the cylinder. When ignition is indicated, the spark plug in the pre-chamber actuates, igniting the first air-fuel mixture. As the first air-fuel mixture combusts, jets of flame and hot gas may exit the pre-chamber and enter the cylinder via one or more holes in the pre-chamber walls. These jets ignite the second air-fuel mixture in the cylinder air-fuel to produce torque.

Pre-chamber ignition may offer performance and efficiency increases over traditional spark-ignition engines during some operating conditions. However, the relatively small volume of a pre-chamber, compared to the volume of a cylinder, may exacerbate build-up on the spark plug and/or injector surfaces during combustion. Such build-up on the spark plug and injector surfaces, wherein a firing tip of the spark plug insulator or an injector tip becomes coated with a foreign substance such as fuel, oil, or soot, is referred to herein as "fouling." Once fouled, the spark plug and/or injector may be unable to provide adequate voltage to consistently trigger pre-chamber combustion until the spark plug is sufficiently cleaned or changed. Fouling of the fuel injector may interfere with fuel injection, leading to inaccurate fueling. Further, the accumulation of foreign substance may not be easily removed. Thus, without a system to prevent or reduce fouling, engines with a pre-chamber ignition system may experience a higher occurrence of ignition issues, such as misfire, and may continue to experience ignition issues until the spark plug and/or injector is cleaned and/or replaced.

The inventors herein have identified the above-mentioned issues and have identified a method to at least partially address them. In one example, a method comprises: combusting a first air-fuel mixture in a pre-chamber of a cylinder during an exhaust stroke of the cylinder responsive to fouling of the pre-chamber. In this way, a temperature of the pre-chamber may be increased to burn off accumulated soot.

As one example, combusting the first air-fuel mixture in the pre-chamber includes, during the exhaust stroke, delivering the first air-fuel mixture to the pre-chamber via air injection by a pre-chamber air injector and fuel injection by a pre-chamber fuel injector and igniting the first air-fuel mixture via a pre-chamber spark plug. Thus, combusting the first air-fuel mixture in the pre-chamber during the exhaust stroke results in an additional pre-chamber combustion reaction that is not used as an ignition source for the cylinder. For example, the method may further include combusting a second air-fuel mixture in the pre-chamber during a compression stroke to provide ignition to the cylinder. The second air-fuel mixture may be different than the first air-fuel mixture, for example, such as having a different quantity of air, a different quantity of fuel, and/or a different air-fuel ratio. Further, the fouling of the pre-chamber may include fouling (e.g., soot build-up) of the pre-chamber spark plug, the pre-chamber air injector, the pre-chamber fuel injector, and/or other surfaces of the pre-chamber. As one example, the fouling may be indicated responsive to a soot load of one or more of the pre-chamber spark plug, the pre-chamber air injector, and the pre-chamber fuel injector exceeding an upper threshold. As another example, the fouling may be indicated responsive to a fouling counter exceeding a threshold. The fouling counter may track a duration and/or a number of engine cycles since last firing the pre-chamber during the exhaust stroke, for example.

As another example, combusting the first air-fuel mixture in the pre-chamber during the exhaust stroke comprises operating in a pre-chamber heating mode. In some examples, the pre-chamber may be operated in the pre-chamber heating mode responsive to pre-chamber fouling, as described above. As an example, the pre-chamber may be operated in the pre-chamber heating mode as a fouling reduction mode, prior to the soot load degrading pre-chamber function. In another example, additionally or alternatively, the pre-chamber may be operated in the pre-chamber heating mode as a pre-chamber efficiency mode. For example, the pre-chamber efficiency mode may increase fuel vaporization efficiency, air and fuel mixing, and ignition efficiency by increasing the temperature of the pre-chamber, for example. As a result, engine efficiency may be increased.

In this way, an engine may be operated to reduce soot build-up on the pre-chamber spark plug and/or injector surfaces that may accumulate during combustion. By reducing pre-chamber fouling, pre-chamber combustion may be consistently triggered, which may decrease an occurrence of cylinder misfire. Further, by removing build up from the injector surfaces by firing the pre-chamber during the exhaust stroke to increase the pre-chamber temperature, the pre-chamber air injector and the pre-chamber fuel injector may more accurately deliver air and fuel, respectively. By burning off soot from the pre-chamber surfaces while the engine is operating, maintenance costs and repair times may be decreased, which may increase customer satisfaction. Further still, by increasing the efficiency of the pre-chamber by increasing the pre-chamber temperature, engine performance may be increased.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
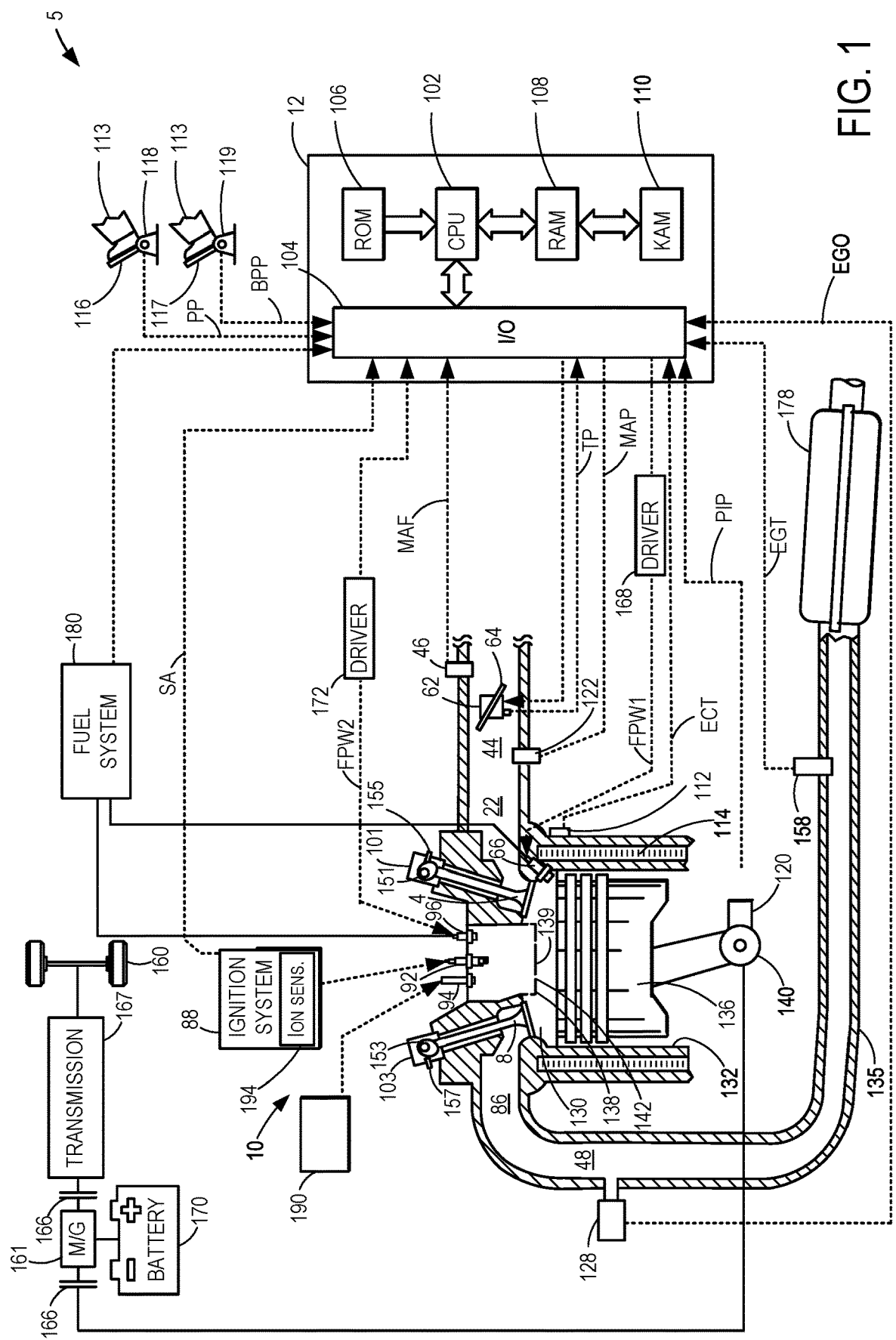
FIG. 1 shows a schematic depiction of a cylinder configuration in a pre-chamber ignition engine system of a vehicle.
Figure 4:
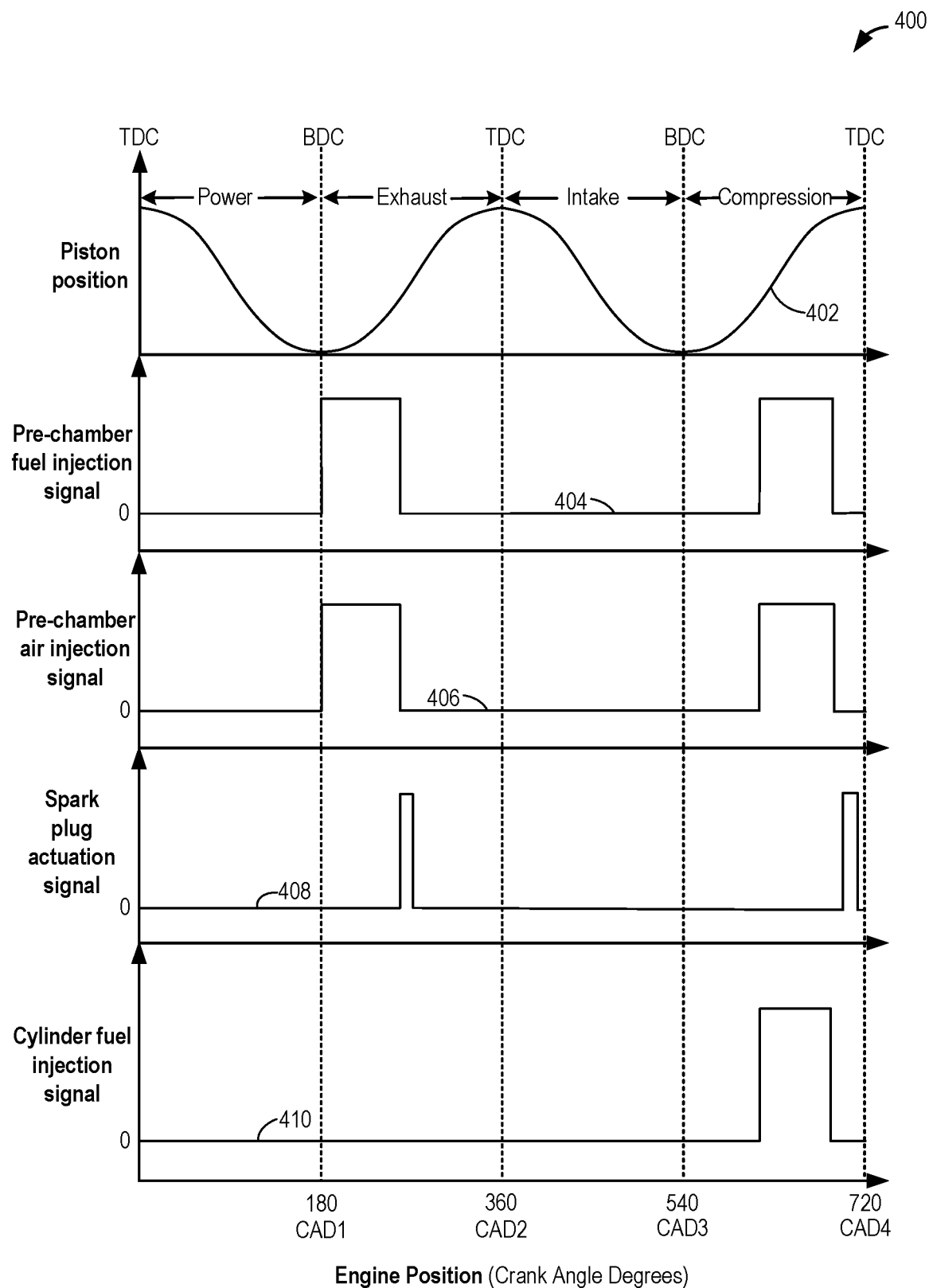
FIG. 4 shows example fuel injection, air injection, and spark timings during a combustion cycle of a cylinder operating in a pre-chamber heating mode.
Figure 5:
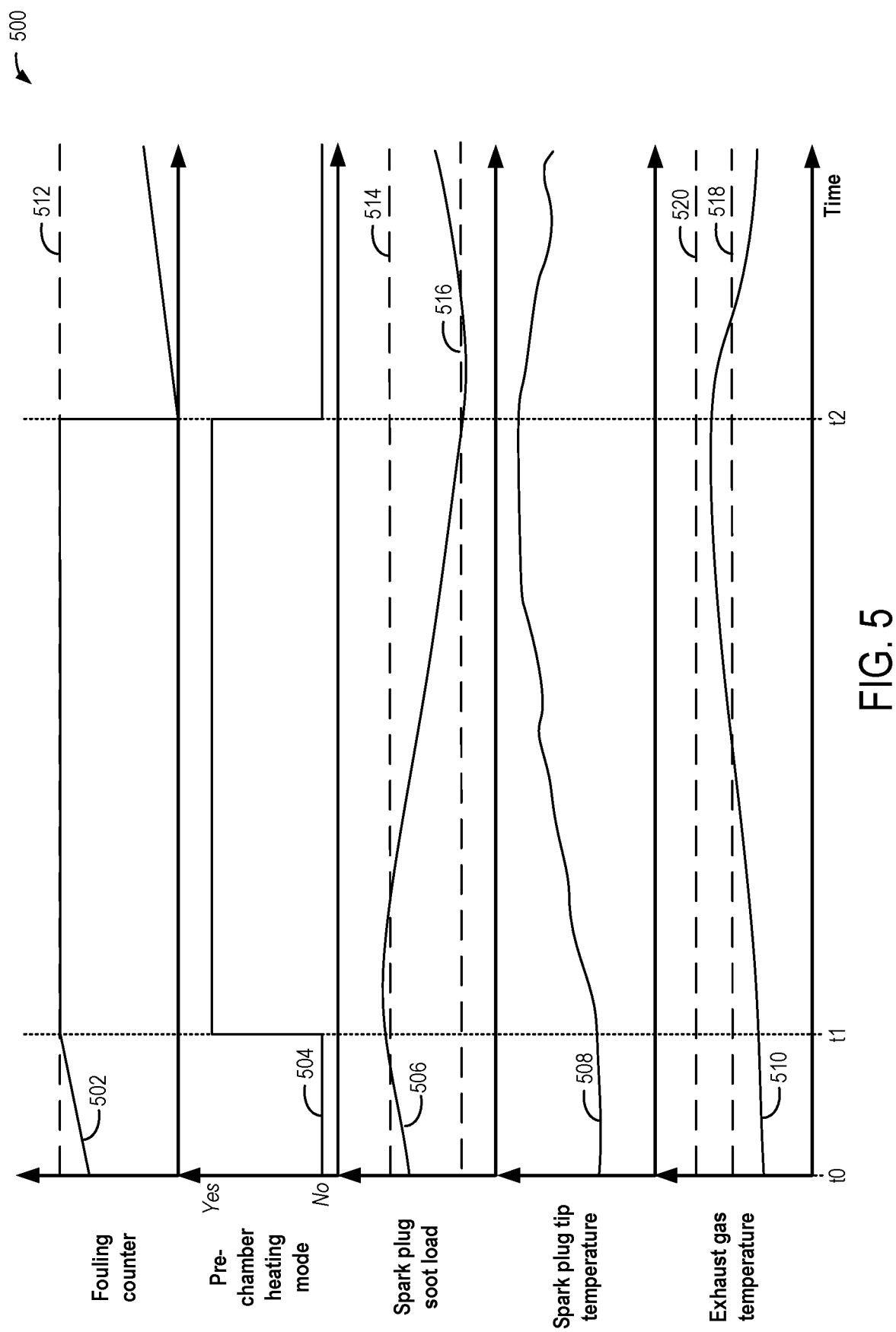
FIG. 5 shows a prophetic example timeline of adjustments to engine operation for reducing a spark plug soot load in a pre-chamber by operating in a pre-chamber heating mode.

The following description relates to systems and methods for reducing fouling of a spark plug and/or and injector in a pre-chamber of a cylinder. The cylinder may have a cylinder configuration including an active pre-chamber that includes a fuel injector, a spark plug, and an air and/or $O_2$ injector, such as shown in FIG. 1. The pre-chamber may be operated to provide an ignition source to the cylinder according to the method of FIG. 2. Further, a controller may adjust fueling, air supply, and spark plug firing of the pre-chamber via the example method of FIG. 3 to enter a pre-chamber heating mode, which may be used to reduce or prevent fouling of pre-chamber surfaces. FIG. 4 shows an example timing diagram of a cylinder operating in the pre-chamber heating mode, wherein an additional pre-chamber combustion event occurs during the exhaust stroke of the cylinder. A prophetic example timeline illustrating transitioning into the pre-chamber heating mode to reduce a spark plug soot load is shown in FIG. 5.

Turning now to the figures, FIG. 1 shows a partial view of a single cylinder 130 of an internal combustion engine 10 that may be included in a vehicle 5. Internal combustion engine 10 may be a multi-cylinder engine. Cylinder (e.g., combustion chamber) 130 includes a coolant sleeve 114 and cylinder walls 132, with a piston 136 positioned therein and connected to a crankshaft 140. Combustion chamber 130 is shown communicating with an intake manifold 44 via an intake valve 4 and an intake port 22 and with an exhaust manifold 48 via an exhaust valve 8 and an exhaust port 86. A throttle 62 including a throttle plate 64 may be provided in an intake passage upstream of intake manifold 44 for varying a flow rate and/or pressure of intake air provided to the engine cylinders.

In the depicted view, intake valve 4 and exhaust valve 8 are located at an upper region of combustion chamber 130. Intake valve 4 and exhaust valve 8 may be controlled by a controller 12 using respective cam actuation systems including one or more cams. The cam actuation systems may utilize one or more of variable displacement engine (VDE), cam profile switching (CPS), variable cam timing (VCT), variable valve timing (VVT), and/or variable valve lift (VVL) systems to vary valve operation. In the depicted example, intake valve 4 is controlled by an intake cam 151, and exhaust valve 8 is controlled by an exhaust cam 153. The intake cam 151 may be actuated via an intake valve timing actuator 101 and the exhaust cam 153 may be actuated via an exhaust valve timing actuator 103 according to set intake and exhaust valve timings, respectively. In some examples, the intake valves and exhaust valves may be deactivated via the intake valve timing actuator 101 and exhaust valve timing actuator 103, respectively. The position of intake cam 151 and exhaust cam 153 may be determined by camshaft position sensors 155 and 157, respectively.

In some examples, the intake and/or exhaust valve may be controlled by electric valve actuation. For example, cylinder 130 may alternatively include an intake valve controlled via electric valve actuation and an exhaust valve controlled via cam actuation, including CPS and/or VCT systems. In still other examples, the intake and exhaust valves may be controlled by a common valve actuator or actuation system or a variable valve timing actuator or actuation system. The various valve control systems may be used to vary a timing, open duration, and lift of intake valve 4 and exhaust valve 8.

Cylinder 130 can have a compression ratio, which is a ratio of volumes when piston 136 is at bottom dead center to top dead center. Conventionally, the compression ratio is in a range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

As a non-limiting example, cylinder 130 is shown including a cylinder fuel injector 66. Fuel injector 66 is shown coupled directly to combustion chamber 130 for injecting fuel directly therein in proportion to a pulse-width of a signal FPW1 received from controller 12 via an electronic driver 168. In this manner, fuel injector 66 provides what is known as direct injection (hereafter also referred to as "DI") of fuel into cylinder 130. In another example, injector 66 may be a port injector providing fuel into the intake port upstream of cylinder 130. Further, while FIG. 1 shows fuel injected to the cylinder via a single injector, the engine may alternatively be operated by injecting fuel via multiple injectors, such as one direct injector and one port injector. For example, both port and direct injectors may be included in a configuration that is known as port fuel and direct injection (PFDI). In such a configuration, controller 12 may vary a relative amount of injection from each injector.

Fuel may be delivered to fuel injector 66 from a high pressure fuel system 180 including one or more fuel tanks, fuel pumps, and a fuel rail. Alternatively, fuel may be delivered by a single stage fuel pump at a lower pressure. Further, while not shown, the fuel tanks may include a pressure transducer providing a signal to controller 12. Fuel tanks in fuel system 180 may hold fuel with different fuel qualities, such as different fuel compositions. These differences may include different alcohol content, different octane, different heats of vaporization, different fuel blends, and/or combinations thereof, etc. One example of fuels with different heats of vaporization includes gasoline as a first fuel type with a lower heat of vaporization and ethanol as a second fuel type with a greater heat of vaporization. In another example, the engine may use gasoline as a first fuel type and an alcohol-containing fuel blend, such as E85 (which is approximately 85% ethanol and 15% gasoline) or M85 (which is approximately 85% methanol and 15% gasoline), as a second fuel type. Other feasible substances include water, methanol, a mixture of ethanol and water, a mixture of water and methanol, a mixture of alcohols, etc. In this way, air and fuel are delivered to cylinder 130, which may produce a combustible air-fuel mixture.

Fuel may be delivered by fuel injector 66 to cylinder 130 during a single cycle of the cylinder. Further, the distribution and/or relative amount of fuel delivered from cylinder fuel injector 66 may vary with operating conditions. Furthermore, for a single combustion event, multiple injections of the delivered fuel may be performed per cycle. The multiple injections may be performed during the compression stroke, intake stroke, or any appropriate combination thereof.

In the example shown in FIG. 1, each cylinder 130 of engine 10 includes a pre-chamber 138 for initiating combustion. Pre-chamber 138 is defined by pre-chamber walls 139 and includes a spark plug 92, an air injector 94, and a pre-chamber fuel injector 96. Air injector 94 may be configured to inject air and/or oxygen into the pre-chamber. In some examples, air injector 94 is an electromagnetic (e.g., solenoid) injector. One or more of ambient air, oxygen, and another combustible gas may be delivered to air injector 94 by a pre-chamber air source 190. Note that in relation to pre-chamber air source 190, the term "air" may refer herein to ambient air, oxygen (e.g., $O_2$), hydrogen (e.g., $H_2$), or a mixture of such gases. In some examples, the pre-chamber air source 190 supplies air injector 94 with ambient air from an air intake passage of the engine. In other examples, pre-chamber air source 190 supplies air injector 94 with onboard-generated $O_2$, which may be stored in a pressurized tank. Pre-chamber fuel injector 96 is shown coupled directly to pre-chamber 138 for injecting fuel directly therein in proportion to a pulse-width of a signal FPW2 received from controller 12 via an electronic driver 172. Fuel may be provided to pre-chamber fuel injector 96 by high-pressure fuel system 180, described above. Alternatively, fuel may be provided to pre-chamber fuel injector 96 from a dedicated pre-chamber fuel system that may be included within or distinct from high-pressure fuel system 180. Thus, both air and fuel are delivered to pre-chamber 138, which may produce an air-fuel mixture with an air-fuel ratio (AFR) that may differ from an AFR in cylinder 130.

Further, the pre-chamber walls 139 may include a plurality of openings, such as an opening 142 shown in FIG. 1. Opening 142 provides an orifice between pre-chamber 138 and cylinder 130, fluidically coupling an interior of pre-chamber 138 to an interior of cylinder 130. As such, during some conditions, gases may flow between the interior of pre-chamber 138 and the interior of cylinder 130. For example, gases (e.g., air, fuel, and/or residual combustion gases) may flow through opening 142 with a directionality and rate based on a pressure difference across opening 142 (e.g., between the interior of pre-chamber 138 and the interior of cylinder 130). Opening 142 (along with any other openings in pre-chamber walls 139) may also provide an ignition flame from pre-chamber 138 to cylinder 130, as will be elaborated below.

An ignition system 88 may provide an ignition spark to pre-chamber 138 via spark plug 92 in response to a spark advance signal SA from controller 12, under select operating modes. A timing of signal SA may be adjusted based on engine operating conditions and a driver torque demand. For example, spark may be provided at maximum brake torque (MBT) timing to maximize engine power and efficiency. Controller 12 may input engine operating conditions, including engine speed, engine load, and exhaust gas AFR, into a look-up table, which may output the corresponding MBT timing for the input engine operating conditions. In other examples, spark may be retarded from MBT to prevent an occurrence of knock. In still other examples, spark may be retarded from MBT to reduce engine torque, such as due to a decrease in driver-demanded torque or a transmission gear shift event. When spark plug 92 provides the ignition spark to pre-chamber 138, the air-fuel mixture within the pre-chamber may combust, the increased pressure of combustion sending jets of flame into cylinder 130 via the plurality of openings in the pre-chamber walls 139, including opening 142. The plurality of openings may be arranged such that the jets of flame are evenly distributed in cylinder 130. The jets of flame may ignite the air-fuel mixture in cylinder 130, causing combustion.

After combustion, a mixture of exhaust gases from both pre-chamber 138 and cylinder 130 may be exhausted from cylinder 130 to exhaust manifold 48 via opening of exhaust valve 8. An exhaust gas sensor 128 is shown coupled to exhaust manifold 48 upstream of an emission control device 178, coupled within an exhaust passage 135. Exhaust gas sensor 128 may be selected from among various suitable sensors for providing an indication of an exhaust gas AFR, such as a linear oxygen sensor or UEGO (universal or wide-range exhaust gas oxygen), a two-state oxygen sensor or EGO (as depicted), a HEGO (heated EGO), a NOx sensor, a HC sensor, or a CO sensor, for example. Emission control device 178 may be a three-way catalyst, a NOx trap, various other emission control devices, or combinations thereof.

Engine 10 may be controlled at least partially by controller 12 and by input from a vehicle operator 113 via an accelerator pedal 116 and an accelerator pedal position sensor 118 and via a brake pedal 117 and a brake pedal position sensor 119. The accelerator pedal position sensor 118 may send a pedal position signal (PP) to controller 12 corresponding to a position of accelerator pedal 116, and the brake pedal position sensor 119 may send a brake pedal position (BPP) signal to controller 12 corresponding to a position of brake pedal 117. Controller 12 is shown in FIG. 1 as a microcomputer, including a microprocessor unit 102, input/output ports 104, an electronic storage medium for executable programs and calibration values shown as a read only memory 106 in this particular example, random access memory 108, keep alive memory 110, and a data bus. Storage medium read-only memory 106 can be programmed with computer readable data representing instructions executable by microprocessor 102 for performing the methods and routines described herein as well as other variants that are anticipated but not specifically listed.

Controller 12 may receive various signals from sensors coupled to engine 10, in addition to those signals previously discussed, including a measurement of inducted mass air flow (MAF) from a mass air flow sensor 46, an engine coolant temperature signal (ECT) from a temperature sensor 112 coupled to coolant sleeve 114, signal EGO from exhaust gas sensor 128, which may be used by controller 12 to determine the AFR of the exhaust gas, an exhaust gas temperature signal (EGT) from a temperature sensor 158 coupled to exhaust passage 135, a profile ignition pickup signal (PIP) from a Hall effect sensor 120 (or other type) coupled to crankshaft 140, a throttle position (TP) from a throttle position sensor coupled to throttle 62, and an absolute manifold pressure signal (MAP) from a MAP sensor 122 coupled to intake manifold 44. A spark plug soot load (e.g., a soot load of spark plug 92) may be determined based on an output of an ion sensing module 194 coupled to spark plug 92. An engine speed signal, RPM, may be generated by controller 12 from signal PIP. The manifold pressure signal MAP from the manifold pressure sensor may be used to provide an indication of vacuum or pressure in the intake manifold.

Based on input from one or more of the above-mentioned sensors, controller 12 may adjust one or more actuators, such as cylinder fuel injector 66, throttle 62, spark plug 92, pre-chamber fuel injector 96, pre-chamber air injector 94, the intake/exhaust valves and cams, etc. The controller may receive input data from the various sensors, process the input data, and trigger the actuators in response to the processed input data based on instruction or code programmed therein corresponding to one or more routines, examples of which is described with respect to FIGS. 2 and 3.

In some examples, vehicle 5 may be a hybrid vehicle with multiple sources of torque available to one or more vehicle wheels 160. In other examples, vehicle 5 is a conventional vehicle with only an engine. In the example shown in FIG. 1, the vehicle includes engine 10 and an electric machine 161. Electric machine 161 may be a motor or a motor/generator and thus may also be referred to herein as an electric motor. Electric machine 161 receives electrical power from a traction battery 170 to provide torque to vehicle wheels 160. Electric machine 161 may also be operated as a generator to provide electrical power to charge battery 170, for example, during a braking operation.

Crankshaft 140 of engine 10 and electric machine 161 are connected via a transmission 167 to vehicle wheels 160 when one or more clutches 166 are engaged. In the depicted example, a first clutch 166 is provided between crankshaft 140 and electric machine 161, and a second clutch 166 is provided between electric machine 161 and transmission 167. Controller 12 may send a signal to an actuator of each clutch 166 to engage or disengage the clutch, so as to connect or disconnect crankshaft 140 from electric machine 161 and the components connected thereto, and/or connect or disconnect electric machine 161 from transmission 167 and the components connected thereto. Transmission 167 may be a gearbox, a planetary gear system, or another type of transmission. The powertrain may be configured in various manners including as a parallel, a series, or a series-parallel hybrid vehicle.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 130.

Figure 2:
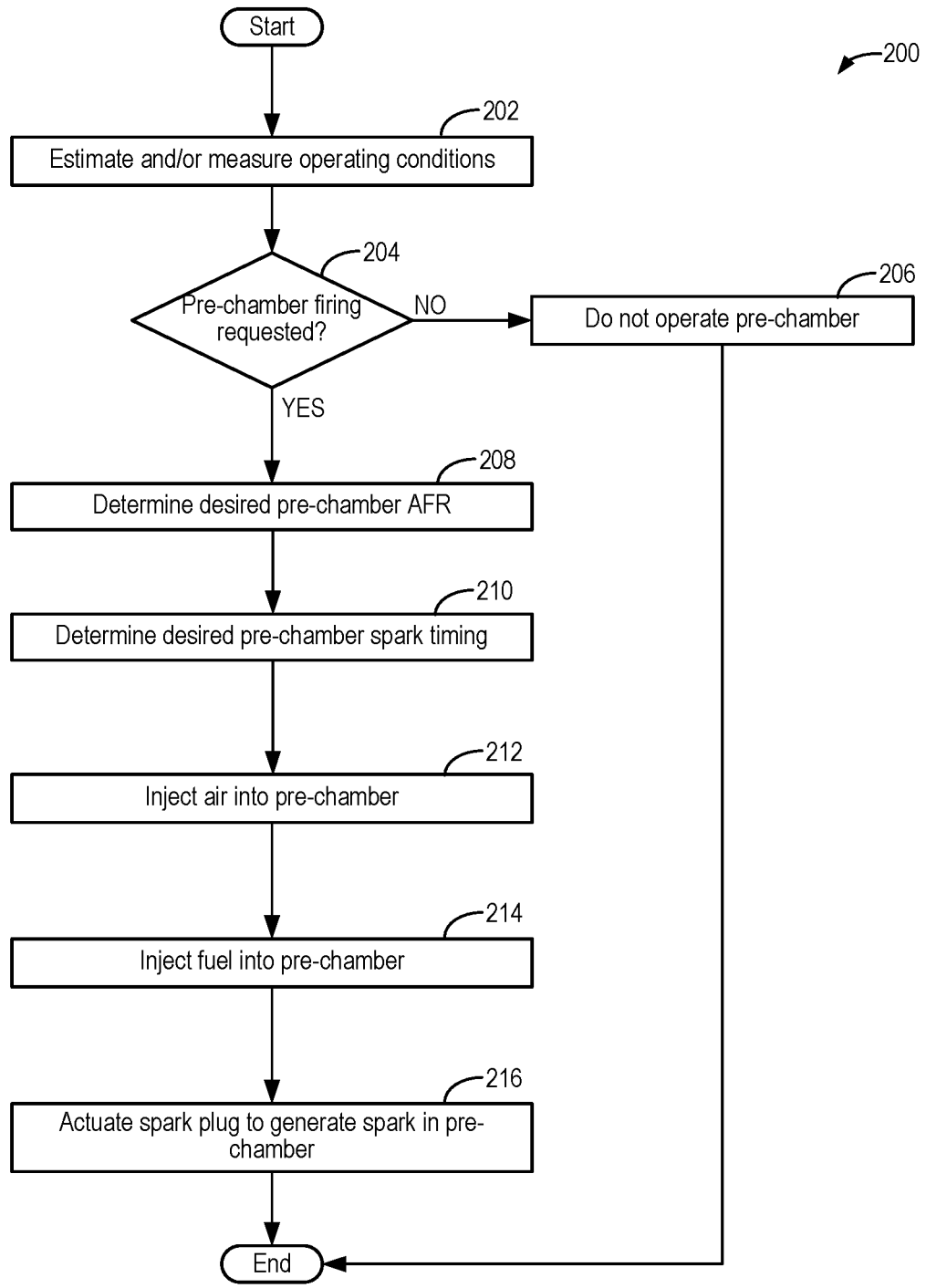
FIG. 2 depicts an example method for operating a pre-chamber of a cylinder.

Next, FIG. 2 shows an example method for operating a pre-chamber of an engine to combust an air-fuel mixture within the pre-chamber. As one example, operating the pre-chamber provides an ignition source for a cylinder of the engine. As another example, operating the pre-chamber increases a temperature of the pre-chamber. Method 200 will be described with respect to engine 10 and the cylinder configuration shown in FIG. 1, although method 200 may be applied in other systems that include a pre-chamber with a spark plug, a fuel injector, and an air/O$_2$ injector. Further, method 200 will be described for one pre-chamber and cylinder pair, although it may be understood that method 200 may be simultaneously and/or sequentially executed for every cylinder of the engine. Instructions for carrying out method 200 and the rest of the methods included herein may be executed by a controller, such as controller 12 of FIG. 1, based on instructions stored on a memory of the controller and in conjunction with signals received from sensors of the engine system, such as the sensors described above with reference to FIG. 1. The controller may employ actuators of the pre-chamber ignition system, including a pre-chamber fuel injector (e.g., pre-chamber fuel injector 96 of FIG. 1), a pre-chamber spark plug (e.g., pre-chamber spark plug 92 of FIG. 1), and a pre-chamber air injector (e.g., pre-chamber air injector 94 shown in FIG. 1) to adjust engine operation according to the methods described below.

At 202, method 200 includes estimating and/or measuring operating conditions. The operating conditions may include, for example, vehicle speed, engine speed, engine load, an engine temperature, an exhaust gas AFR, an accelerator pedal position, a brake pedal position, and a position of a throttle (e.g., throttle position). The operating conditions may be measured by one or more sensors communicatively coupled to the controller or may be inferred based on available data. For example, the accelerator pedal position may be measured by an acceleration position sensor, such as acceleration pedal position sensor 118 of FIG. 1, and the brake pedal position may be measured by a brake pedal position sensor, such as brake pedal position sensor 119 of FIG. 1. Together, the accelerator pedal position and the brake pedal position may indicate a demanded amount of engine torque. As another example, the AFR may be determined based on an oxygen level detected by an exhaust gas oxygen sensor, such as exhaust gas sensor 128 of FIG. 1. Similarly, the throttle position may be measured using a throttle position sensor coupled to the throttle.

At 204, method 200 includes determining whether a firing event is requested in the pre-chamber. In some examples, the pre-chamber firing event may be requested during nominal engine operation to provide an ignition source for the cylinder during each combustion cycle. A combustion cycle (e.g., a cylinder cycle) may refer to a four stroke movement of a piston of the cylinder, the four strokes including an intake stroke, a compression stroke, a power stroke, and an exhaust stroke. When the pre-chamber firing event is requested to provide an ignition source for the cylinder during a combustion cycle, the firing event may occur during the end of a compression stroke. In another example, the pre-chamber firing event may be requested during an exhaust stroke of a combustion cycle to increase a temperature of the pre-chamber (e.g., while operating in a pre-chamber heating mode described below with respect to FIG. 3). In yet another example, the pre-chamber firing event may be requested during a cold start condition, before initiating cylinder combustion.

If the pre-chamber firing event is not requested at 204, method 200 proceeds to 206, and includes not operating the pre-chamber. In some examples, the pre-chamber firing event may not be requested while engine combustion is discontinued. For example, engine combustion may be discontinued while the engine is shut down or during a fuel-cut condition, such as when cylinder fueling is shut off while the vehicle speed decreases. In another example, the pre-chamber firing event may not be requested when the pre-chamber firing event has already been performed during the combustion cycle. Not operating the pre-chamber may include not injecting fuel and air into the pre-chamber so that there is no air-fuel mixture for combustion within the pre-chamber. Without an air-fuel mixture to combust, not operating the pre-chamber may further include not activating the spark plug in the pre-chamber. Further, because combustion is not performed in the pre-chamber, not operating the pre-chamber may further include not providing an ignition source to the cylinder. However, in other examples, an alternative ignition source may be provided to the cylinder (e.g., via a cylinder spark plug that is independent from the pre-chamber spark plug or via compression ignition). In one example, the controller may adjust the pulse-widths of actuation signals to the fuel injector and the air injector such that no air-fuel mixture is injected into the pre-chamber. For example, no actuation signal may be sent to each of the fuel injector and the air injector. Further, the controller may adjust a control signal to the ignition system of the engine such that the spark plug in the pre-chamber is not activated.

If a pre-chamber firing event is requested at 204, method 200 proceeds to 208 and includes determining a desired pre-chamber AFR (e.g., a ratio of an amount of air injected to an amount of fuel injected into the pre-chamber). The desired AFR of the pre-chamber may be determined by the controller based on the AFR of the cylinder, such that combustion of an air-fuel mixture in the pre-chamber ignites an air-fuel mixture in the cylinder while minimizing emissions, as an example. For example, the controller may input the AFR of the cylinder and the current engine operating conditions, such as engine speed, exhaust gas temperature, and engine load, into one or more look-up tables, function, and maps, which may output the desired pre-chamber AFR to achieve combustion. As an example, the desired AFR of the pre-chamber may be stoichiometry. As another example, the desired AFR of the pre-chamber may be rich relative to stoichiometry during an engine cold start condition, which may increase combustion stability in the cold start condition, for example. As still another example, the desired AFR of the pre-chamber may be richer than stoichiometry when fuels with higher evaporation temperatures, such as E85, are used in order to account for evaporated fuel that participates in the combustion and non-evaporated fuel that does not participate in combustion to achieve a substantially stoichiometry combustion with the evaporated fuel. As yet another example, the desired AFR of the pre-chamber may be adjusted from stoichiometry when an operating AFR of the cylinder is adjusted from stoichiometry such that when the combustion gases from the cylinder and the pre-chamber are combined, the combined gases have an AFR approximately equal to stoichiometry. As a further example, the controller may determine the desired AFR of the pre-chamber based on based on a request to operate in a pre-chamber heating mode, as elaborated in FIG. 3.

At 210, method 200 includes determining a desired pre-chamber spark timing for the pre-chamber firing event. Determining the desired pre-chamber spark timing may include determining when to ignite the air-fuel mixture in the pre-chamber relative to a position of a piston of the cylinder. Although a cylinder spark plug firing induces combustion in a cylinder of a traditional spark-ignition engine, in an engine with pre-chamber ignition, combustion in the pre-chamber induces combustion in the cylinder. Thus, just as cylinder spark timing in the traditional spark-ignition engine may be adjusted relative to the spark timing for maximum brake torque (MBT) based on engine operating conditions, the timing of the pre-chamber firing event may be shifted relative to MBT based on engine operating conditions in order to achieve a desired cylinder ignition timing. For example, the pre-chamber spark timing may be retarded relative to MBT timing to increase an exhaust gas temperature, while the pre-chamber spark timing may be advanced closer to MBT timing to increase a torque output of the cylinder. As another example, if the engine is borderline limited and is unable to operate at MBT timing, engine knock control may advance or retard the pre-chamber spark timing to operate the engine at the borderline limit. In one example, the controller may input one or more engine operating conditions (e.g., engine speed, engine load, the exhaust gas temperature, a borderline knock limit, and cylinder AFR) into one or more look-up tables, functions, or maps to determine the desired timing for the pre-chamber firing event. In another example, the controller may make a logical determination (e.g., regarding the pre-chamber spark timing) based on logic rules that are a function of the one or more engine operating conditions. In still another example, the controller may determine the desired timing for the pre-chamber firing event based on instructions for operating in the pre-chamber heating mode, as will be elaborated below with respect to FIG. 3.

At 212, method 200 includes injecting air into the pre-chamber. In some examples, the air injected may be ambient air from an intake manifold of the engine, while in other examples, the pre-chamber air injector may provide onboard-generated $O_2$ or another combustible gas such as $H_2$. The controller may adjust an amount of air injected into the pre-chamber based on the desired AFR of the pre-chamber, as determined at 208, and the position of the piston in the cylinder. For example, the controller may input the engine operating conditions, including the piston position and the desired AFR of the pre-chamber, into a look-up table, algorithm, or map, which may output a desired air injection amount. As an example, the air injection event may not only provide air for combustion, but may also purge residual gases from a previous pre-chamber firing event from the pre-chamber. In another example, the air injection amount may be held substantially constant while the fuel injection amount is varied to compensate for changes in the desired AFR. For example, an amount of air injected may be approximately equal to a volume in the pre-chamber.

After determining the amount of air to be injected, the controller may inject the desired air amount by adjusting the pulse-width of an actuation signal sent to the pre-chamber air injector. Further, an injection pressure may be above a peak pressure in the cylinder. Because of this, some of the air injected may flow into the cylinder (e.g., due to the pressure in the cylinder being lower than the pressure in the pre-chamber). An amount of air injected to the pre-chamber that flows into the cylinder may be determined based on a pressure difference between the air injector pressure and the pressure in the cylinder and a size of opening(s) in the pre-chamber walls. This value may be used in adjusting cylinder fuel control, for example.

At 214, method 200 includes injecting fuel into the pre-chamber. The controller may adjust an amount of fuel injected into the pre-chamber based on the desired AFR of the pre-chamber, as determined at 208, and the amount of air injected at 212. For example, the controller may input the desired pre-chamber AFR into one or more look-up tables, functions, and maps, which may output a desired fuel amount to inject that will achieve the desired AFR in the pre-chamber. In one example, the controller may inject the desired fuel amount by adjusting the pulse-width of an actuation signal sent to the pre-chamber fuel injector, such as FPW2 shown in FIG. 1. The injected fuel may mix with the injected air (e.g., injected at 212) to form an air-fuel mixture.

At 216, method 200 includes actuating the pre-chamber spark plug to generate a spark in the pre-chamber. The controller may generate a control signal (e.g., signal SA) that is sent an ignition system (e.g., ignition system 88 of FIG. 1) to actuate the pre-chamber spark plug at the pre-chamber spark timing determined at 210. Generating the spark in the pre-chamber may cause the air-fuel mixture in the pre-chamber to combust, sending jets of hot gas and flame into the cylinder via a plurality of holes in the pre-chamber walls. When the cylinder also includes a combustible air-fuel mixture, the jets of hot gas and flame ignite the air-fuel mixture in the cylinder. After 216, method 200 may end.

In this way, the pre-chamber of a cylinder may be operated to ignite a first air-fuel mixture within the pre-chamber, which may further ignite a second air-fuel mixture in the cylinder. In some examples, method 200 may run continuously during nominal engine operation in order to continuously provide a cylinder ignition source when indicated. An engine with pre-chamber ignition may provide a higher power output and/or reduced fuel consumption relative to an engine without pre-chamber ignition, for example. Further, jets of flame and hot gas from the pre-chamber may cause the second air-fuel mixture to combust more fully and with a lower peak combustion temperature than a spark plug, which may decrease NOx emissions. Further, a higher EGR rate may be used without decreased combustion stability. With active air and fuel injection in the pre-chamber, the AFR of the pre-chamber may be predicted based on injection amounts of the air and fuel, which may increase ignition control, and active air injection may further purge the pre-chamber of residual gases from previous cylinder cycles, for example. As another example, actively injecting both air and fuel into the pre-chamber increases a control and an accuracy of the pre-chamber AFR compared with pre-chambers that use passive diffusion of air and/or fuel from the cylinder. As a result, the pre-chamber may more reliably operate over a wider range of engine operating conditions to provide cylinder ignition.

However, substances produced during pre-chamber combustion, such as soot, and fuel additives, such as methycyclopentadienyl manganese tricarbonyl (MMT), lead, or ferrocene, may build-up on pre-chamber surfaces during engine operation, including the spark plug, the air injector, and the fuel injector, for example. Such build-up (e.g., fouling) may affect engine performance. For example, spark plug fouling may cause misfire, which may prevent a cylinder from producing power. In another example, injector fouling may interfere with injection of air and/or fuel, causing a pre-chamber to operate at a different AFR than the commanded AFR.

Figure 3:
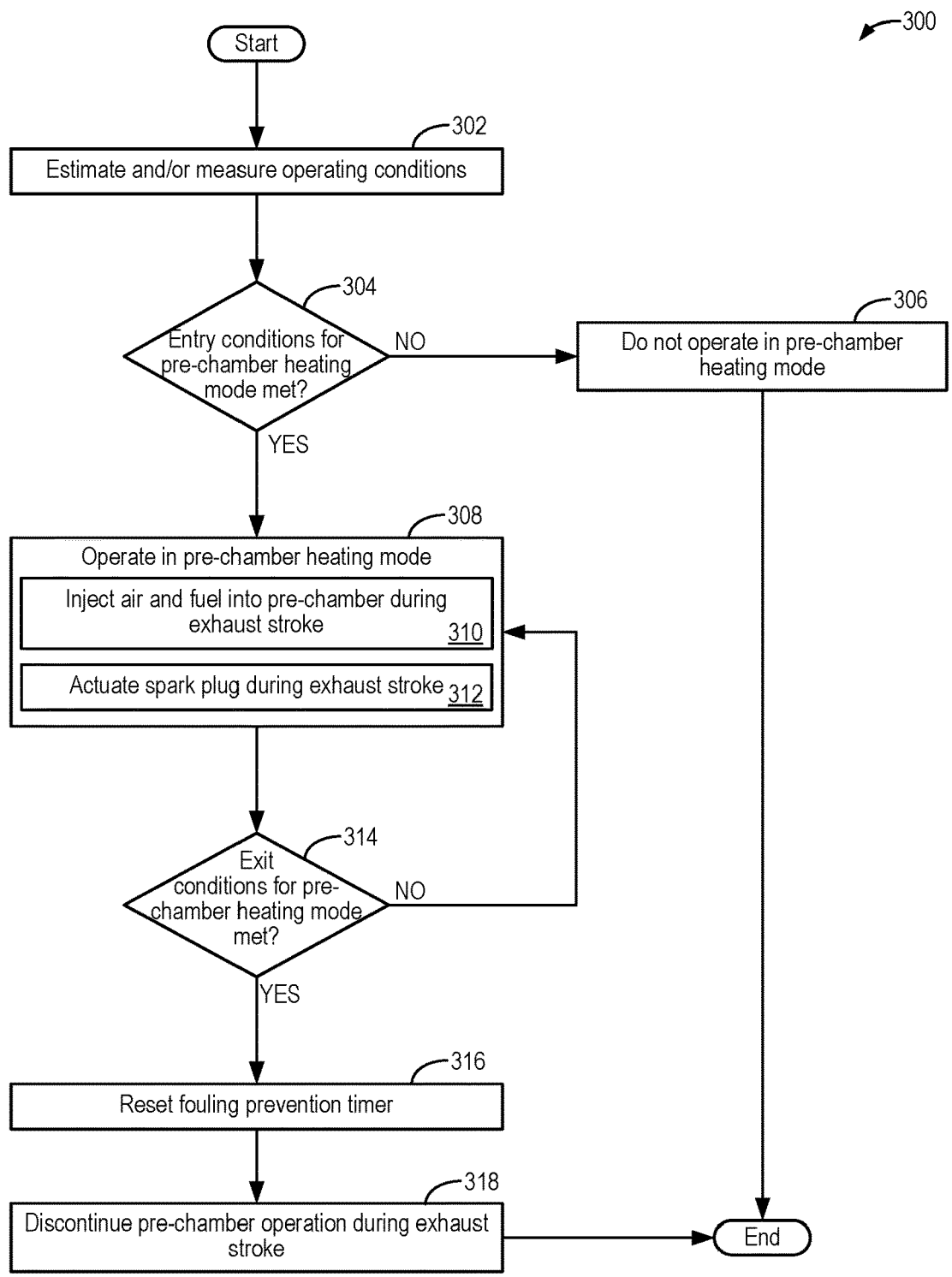
FIG. 3 depicts an example method for reducing spark plug and/or injector fouling in a pre-chamber of a cylinder by operating in a pre-chamber heating mode.

Therefore, FIG. 3 shows an example method 300 for operating in a pre-chamber heating mode. By operating in the pre-chamber heating mode, a temperature of the pre-chamber may be increased, thereby reducing fouling of the pre-chamber surfaces, for example. In other examples, increasing the temperature of the pre-chamber may increase pre-chamber efficiency. For example, the temperature of the pre-chamber may be increased to increase pre-chamber efficiency while the engine is on and operating or during a cold start. As illustrated in FIG. 1, the pre-chamber may be located in a clearance volume of a cylinder and may include a fuel injector (e.g., fuel injector 96), a spark plug (e.g., spark plug 92) and an air injector (e.g., air injector 94), all of which may accumulate soot or other materials during operation. As such, method 300 will be described with respect to the cylinder configuration shown in FIG. 1, although method 300 may be applied in other systems that include pre-chamber ignition. Instructions for carrying out method 300 may be executed by a controller, such as controller 12 of FIG. 1, based on instructions stored on a memory of the controller and in conjunction with signals received from sensors of the engine system, such as the sensors described above with reference to FIG. 1 (e.g., exhaust gas temperature sensor 158). The controller may employ engine actuators of the engine system to adjust engine operation according to the methods described below. Method 300 will be described with respect to a single cylinder including a pre-chamber, although method 300 may be performed simultaneously for a plurality of cylinders in a multi-cylinder engine with pre-chamber ignition.

At 302, method 300 includes estimating and/or measuring operating conditions. The operating conditions may include, for example, vehicle speed, engine speed, engine load, spark plug soot load, spark plug tip temperature, and exhaust gas temperature. The operating conditions may be measured by one or more sensors communicatively coupled to the controller or may be inferred based on available data. For example, the exhaust gas temperature may be measured by an exhaust gas temperature sensor, such as exhaust gas temperature sensor 158 of FIG. 1. As another example, the controller may actively determine a soot load (e.g., an amount of foreign substance build-up) accumulating on pre-chamber surfaces during nominal engine operation. In some examples, the controller may estimate the soot load (e.g., the amount of soot) accumulated per engine cycle (wherein each cylinder of the engine completes one combustion cycle in a dedicated firing order). In other examples, the controller may estimate the soot load based on engine operating conditions, such as a number of engine cycles at high engine load. As another example, the soot load may be determined based on an ionization current of the spark plug or an output of an ion sensor coupled to the spark plug (e.g., ion sensing module 194 of FIG. 1). For example, a steady-state ionization signal (e.g., current) prior to energization of an ignition coil of the spark plug, also referred to as a pre-dwell phase, may provide a measurement of shunt resistance, which decreases as conductive carbon-containing deposits (soot) form on the spark plug. Therefore, increases in the pre-dwell ionization current may indicate a lowered shunt resistance due to spark plug soot accumulation. As yet another example, the controller may infer a temperature of a pre-chamber surface, such as a spark plug tip temperature, based on engine operating conditions such as engine speed, engine load, and exhaust gas temperature, and the temperature of the pre-chamber surface may be used to infer the soot load.

At 304, method 300 includes determining if conditions for entering the pre-chamber heating mode are met. In some examples, such as when the pre-chamber heating mode is used as a pre-chamber fouling reduction mode, the conditions for entering the pre-chamber heating mode (e.g., entry conditions) may include a fouling counter exceeding a first threshold. The controller may use the fouling counter to track a duration and/or number of engine cycles elapsed since last operating in the pre-chamber heating mode. Thus, in some examples, the first threshold may be a first threshold number of engine cycles. The first threshold number of engine cycles may be a pre-determined, non-zero number stored in controller memory that corresponds to a calibrated number of engine cycles over which soot is expected to accumulate on the pre-chamber surfaces. In some examples, the controller may adjust the first threshold number of engine cycles by inputting the engine operating conditions (e.g., exhaust gas temperature, engine load, engine speed, spark plug tip temperature) into one or more look-up tables, maps, or functions, which may output the adjusted threshold number of combustion cycles. In other examples, the fouling counter may track an engine "on" duration during which the engine combusts air and fuel, and the first threshold may be a first threshold duration over which soot is expected to accumulate on the pre-chamber surfaces. In some examples, the first threshold (e.g., the first threshold number of engine cycles or the first threshold duration) may be calibrated to reduce the soot load of the pre-chamber before the soot load accumulates enough to increase an occurrence of pre-chamber misfire. The entry conditions for the pre-chamber heating mode may additionally or alternatively include the spark plug soot load exceeding a first threshold spark plug soot load above which spark plug firing may not successfully occur. In some examples, the first threshold spark plug soot load may be a pre-determined, non-zero number stored in controller memory, while in other examples, the controller may determine the threshold spark plug soot load based on the engine operating conditions by referring to one or more look-up tables, maps, or functions.

In some examples, the entry conditions for the pre-chamber heating mode may be modified based on whether the engine is in a green state (such as when the vehicle is in a pre-delivery state and is still at the assembly plant) or in a non-green state (such as when the vehicle is in a post-delivery state and has left the assembly plant). As such, a green engine condition is confirmed when the engine is coupled to a vehicle in a pre-delivery state at an assembly plant. In one example, a green engine condition may be determined based on a number of key-on events that have elapsed as well as a duration of each key-on event (that is, a duration elapsed between key-on and key-off for each key-on event). For example, the engine may be a green engine on a drive cycle after a first green engine start (or a number of engine starts after the first green engine start) following vehicle assembly and before the vehicle leaves the assembly plant. As such, while the engine is still in the pre-delivery state, various tests may be performed on the engine to assess engine component function. In addition, various functions may be diagnosed, such as emissions compliance, leak detection, etc., by moving the vehicle from one station to another station at the assembly plant. In some examples, pre-chamber fouling may be more likely to occur during the pre-delivery state due to short operating times and low engine loads.

Thus, the entry conditions for the pre-chamber heating mode may be differently calibrated when the engine is in the pre-delivery state than when the engine is in the post-delivery state (described above) in order to more aggressively reduce pre-chamber fouling. For example, the first threshold for the fouling counter may be lower for the pre-delivery calibration than for the post-delivery calibration. As another example, additionally or alternatively, the first spark plug soot load may be lower for the pre-delivery calibration than for the post-delivery calibration. While the engine is in the pre-delivery state, the engine may be operated with a retarded cam shaft schedule to keep more heat in in the cylinder (instead of sending the heat to the catalyst) as well as a leaner pre-chamber AFR, which may prevent excessive exhaust gas temperatures due to the more aggressive pre-chamber fouling reduction method. Once the vehicle is delivered (e.g., to a dealer or customer), the pre-delivery calibrations may be turned off or may otherwise expire and be transitioned to the post-delivery calibrations.

In an alternative example, such as when the pre-chamber heating mode is used for increasing pre-chamber efficiency, the entry conditions for the pre-chamber heating mode may include a pre-chamber temperature being below a first threshold pre-chamber temperature. The first threshold pre-chamber temperature may be a pre-determined, non-zero number stored in controller memory below which the pre-chamber may not operate efficiently. In such an example, the pre-chamber heating mode may serve as a pre-chamber efficiency mode. As another example, the entry conditions for the pre-chamber heating mode for increasing the pre-chamber efficiency may include an engine load being below a first threshold engine load while the engine speed is less than a threshold engine speed. The first threshold engine load may be a pre-determined, non-zero load stored in controller memory below which the pre-chamber may not operate efficiently at engine speeds less than the threshold engine speed. For example, the pre-chamber may be anticipated to be less than the first threshold pre-chamber temperature when the engine load is less than the first threshold engine load. In yet another example, the entry conditions for the pre-chamber heating mode for increasing the pre-chamber efficiency may include a fuel-cut condition, during which cylinder combustion is not commanded. In such a condition, the pre-chamber heating mode may maintain a temperature of the pre-chamber until cylinder combustion resumes.

In another alternative example, the entry conditions for the pre-chamber heating mode may be met during a cold start condition. As one example, the cold start condition may be confirmed when an engine temperature is less than a threshold engine temperature, the threshold engine temperature referring to a non-zero temperature that separates engine cold starts from hot starts. As another example, the cold start condition may be confirmed when the engine temperature is substantially equal to ambient temperature (e.g., within a threshold of the ambient temperature) at engine start. As yet another example, the cold start condition may be confirmed when an engine-off duration prior to a start request is greater than a threshold duration, the threshold duration referring to a non-zero time duration that is expected to cool the engine to below the threshold engine temperature and/or bring the engine temperature to within the threshold of the ambient temperature. Operating in the pre-chamber heating mode during the cold start condition may decrease an incidence of pre-chamber misfire during the cold start condition, for example.

Further, in some examples, when the pre-chamber heating mode is used either as the fouling reduction mode or the pre-chamber efficiency mode, the entry conditions may include the measured exhaust gas temperature being lower than a first threshold exhaust gas temperature. The threshold temperature may be a pre-determined, non-zero temperature above which additional exhaust gas temperature increases during the execution of the pre-chamber heating mode may degrade exhaust system components, such as an emission control device (e.g., emission control device 178). In some examples, all of the entry conditions may be confirmed for the conditions for entering the pre-chamber heating mode to be considered met. In other examples, the conditions for entering the pre-chamber heating mode may be considered met when at least the fouling counter exceeds the threshold, or the spark plug soot load exceeds the threshold soot load, and the exhaust gas temperature is below the threshold exhaust gas temperature.

If the entry conditions are not met, method 300 proceeds to 306 and includes not operating in the pre-chamber heating mode. In some examples, not operating in the pre-chamber heating mode may include not adjusting engine operation for the purpose of pre-chamber heating. For example, an air-fuel mixture may not be combusted in the pre-chamber during an exhaust stroke for the purpose of increasing a temperature of the pre-chamber. As another example, engine operation may continue to be adjusted according to a driver demand, for example. In still other examples, not operating in the pre-chamber heating mode may include adjusting engine operation to operate in another mode, for example, according to a request for a diagnostic procedure. Following 306, method 300 ends. As one example, method 300 may be repeated as engine operating conditions change so that the controller may re-evaluate whether the pre-chamber heating mode entry conditions are met.

If the entry conditions are instead met, method 300 proceeds to 308 and includes operating in the pre-chamber heating mode. Operating in the pre-chamber heating mode includes operating the pre-chamber during the exhaust stroke. The pre-chamber may be operated during the exhaust stroke according to the method of FIG. 2, such that an air-fuel mixture is ignited by the spark plug. The exhaust stroke may occur after energy from a combustion reaction in the cylinder drives a piston (e.g., piston 136 of FIG. 1) downwards during the power stroke. Further, the cylinder is unfueled during the exhaust stroke. Thus, operating the pre-chamber in the pre-chamber heating mode includes operating the pre-chamber while the cylinder is unfueled.

In an alternative example, operating in the pre-chamber heating mode includes operating the pre-chamber while the cylinder is unfueled while the engine is in the cold start condition. As one example, the pre-chamber is operated in the pre-chamber heating mode responsive to the cold start condition being confirmed and while the engine is at rest (e.g., with a speed of zero). For example, the pre-chamber may be operated in the pre-chamber heating mode prior to cranking. As another example, the pre-chamber may be operated in the pre-chamber heating mode responsive to the cold start condition during cranking and prior to combustion commencing in the cylinders. For example, the engine may be motored by a starter motor or electric machine (e.g., electric machine 161 of FIG. 1), and the pre-chamber may be operated when an engine position reaches a desired engine position. The desired engine position may correspond to an intake stroke or an exhaust stroke of the cylinder, for example.

Operating in the pre-chamber heating mode includes injecting air and fuel into the pre-chamber during the exhaust stroke (or at another desired engine position and/or speed), as indicated at 310. For example, the air is injected into the pre-chamber by actuating the air injector during the exhaust stroke, and the fuel is injected into the pre-chamber by actuating the fuel injector during the exhaust stroke. An amount of fuel and an amount of air injected into the pre-chamber during the exhaust stroke may be determined based on engine operating conditions by referring to one or more look-up tables, maps, or functions, and further may be calibrated to provide a desired increase in the pre-chamber temperature. During the exhaust stroke, cylinder pressure may be lower relative to the compression stroke, allowing more air to fill the pre-chamber, which may enable lean pre-chamber operation. Thus, in some examples, the amount of air and the amount of fuel may be determined so that the pre-chamber operates lean relative to stoichiometry, which may increase pre-chamber temperatures. In other examples, the amount of air and the amount of fuel may be determined so that the pre-chamber operates at stoichiometry. For example, the controller may adjust a pulse width of an actuation signal sent to the fuel injector such that the determined amount of fuel is injected into the pre-chamber during the exhaust stroke. Further, the controller may adjust a pulse width of an actuation signal sent to the air injector of the pre-chamber such that the determined amount of air (e.g., ambient air, $O_2$, or the like) is injected during the exhaust stroke, for example.

Alternatively, as mentioned above, the air and fuel may be injected into the pre-chamber when the engine is at the desired engine speed and/or at the desired engine position. In one example, the desired engine speed is zero. In another example, the desired engine speed is a non-zero speed achieved during cranking. In one example, the desired engine position corresponds to a position at which a piston in the cylinder is relatively low and traveling downward, such as during what would be an intake stroke or an exhaust stroke when the engine is combusting.

Operating in the pre-chamber heating mode further includes actuating the pre-chamber spark plug during the exhaust stroke (or at another desired engine position and/or speed), as indicated at 312. Actuating the pre-chamber spark plug generates a spark in the pre-chamber, which may ignite the air-fuel mixture inside the pre-chamber, causing a combustion reaction. For example, the controller may actuate the spark plug via a spark advance signal (SA), as shown in FIG. 1. Further, jets of flame and hot gas may exhaust from the pre-chamber at a high speed during the combustion reaction. However, because no additional fuel or air was added to the cylinder combustion chamber at 308, a combustion reaction may not take place in the cylinder. In other examples, the jets of flame and/or hot gas may cause residual fuel and/or air in the cylinder to combust. After combustion, exhaust gases from the exhaust stroke combustion in the pre-chamber may exit the cylinder via an exhaust valve of the cylinder.

In some examples, the controller may adjust other cylinder operating conditions during the pre-chamber heating mode to compensate for the additional heat and exhaust gases generated by the exhaust stroke combustion in the pre-chamber. For example, the controller may adjust a pulse-width of a signal to an exhaust valve timing actuator to retard an exhaust valve opening, which may further increase a temperature of the pre-chamber and the cylinder. As one example, adjusting the cylinder operating conditions during the pre-chamber heating mode may include further retarding the exhaust valve opening timing when the engine is in a pre-delivery state relative to a post-delivery state. As another example, the controller may adjust a pulse-width of a signal to a cylinder fuel injector to inject less fuel into the cylinder due to additional fuel and residual gases that may escape the pre-chamber during the exhaust stroke combustion. In some examples, the controller may adjust a pulse-width of a signal to an intake valve timing actuator to open an intake valve of the cylinder earlier relative to nominal engine operating conditions, which may increase purging of the additional exhaust gases created by the exhaust stroke combustion event. As another example, the controller may advance spark timing towards MBT, or slightly advanced of MBT, in order to increase pre-chamber temperatures.

By combusting an air-fuel mixture in the pre-chamber during the exhaust stroke, a temperature of the pre-chamber may increase relative to operating with one pre-chamber firing event per combustion cycle (e.g., during the compression stroke). At the higher temperature caused by the pre-chamber firing event during the exhaust stroke, some of the soot and/or other build-up on the pre-chamber surfaces may burn away, thus reducing fouling on the pre-chamber surfaces. In some examples, the higher temperature caused by the pre-chamber firing during the exhaust stroke may increase pre-chamber efficiency. For example, by increasing the pre-chamber temperature, pre-chamber combustion may require less fuel due to increased fuel vaporization at the higher pre-chamber temperature.

At 314, method 300 includes determining whether exit conditions for the pre-chamber heating mode are met. The exit conditions for the pre-chamber heating mode may include completing a second threshold number of engine cycles in the pre-chamber heating mode and/or a second threshold duration in the pre-chamber heating mode. For example, the controller may determine that operating in the pre-chamber heating mode for the second threshold number of engine cycles (e.g., igniting the air-fuel mixture in the pre-chamber during the exhaust stroke for the second threshold number of engine cycles) may be sufficient to reduce the amount of build-up on pre-chamber surfaces. Therefore, the second threshold number of engine cycles may be a pre-determined, non-zero threshold stored in controller memory, for example, that corresponds to a number of engine cycles in the pre-chamber heating mode that provides a desired reduction in the pre-chamber soot load. In another example, the second threshold number of engine cycles may be determined based on engine operating conditions, such as exhaust gas temperature, for example. As another example, the controller may determine that operating in the pre-chamber heating mode for the second threshold duration may be sufficient to reduce the amount of build-up on pre-chamber surfaces. Therefore, the second threshold duration may be a pre-determined, non-zero threshold stored in controller memory, for example, that corresponds to a duration in the pre-chamber heating mode that provides a desired reduction in the pre-chamber soot load.

A further exit condition for the pre-chamber heating mode may be the exhaust gas temperature exceeding a second threshold exhaust gas temperature. Due to the additional heat created by combustion during the exhaust stroke, exhaust gas temperature may increase during the pre-chamber heating mode. In some examples, the second threshold exhaust gas temperature may be a threshold temperature of one or more exhaust system components above which component degradation may occur. The second threshold exhaust gas temperature may be higher than the first threshold exhaust gas temperature, for example. If the sensed exhaust gas temperature exceeds the second threshold exhaust gas temperature, the exit conditions for the pre-chamber heating mode may be considered met.

Yet another exit condition for the pre-chamber heating mode may be the soot load falling below a second threshold soot load. The second threshold soot load may be a pre-determined spark plug soot load below which the spark plug is considered to be sufficiently cleaned and is less than the first threshold spark plug soot load described above at 304. Any or all of the exit conditions may be confirmed for the conditions for exiting the pre-chamber heating mode to be considered met.

Another exit condition for the pre-chamber heating mode may be the cold start condition no longer being confirmed. In alternative examples, the pre-chamber may be operated in the pre-chamber heating mode during the cold start until a pre-determined number of combustion events in the pre-chamber is achieved, the engine reaches a pre-determined speed, and/or combustion commences in the engine cylinders, at which time the exit from the pre-chamber heating mode may be initiated.

If the exit conditions for the pre-chamber heating mode are not met at 314, method 300 returns to 308 and continues to operate in the pre-chamber heating mode, which includes injecting an air-fuel mixture into the pre-chamber and igniting the air-fuel mixture with a spark from the pre-chamber spark plug during the exhaust stroke of the cylinder. Additional exhaust stroke combustion events in the pre-chamber may further increase the temperature of the pre-chamber, thus removing additional build-up on the pre-chamber surfaces as well as increasing the pre-chamber efficiency.

If the exit conditions for the pre-chamber heating mode are met at 314, method 300 continues to 316 and includes resetting the fouling reduction counter. For example, even if the pre-chamber was operated in the pre-chamber heating mode for the pre-chamber efficiency mode, the higher temperature operation may still reduce the pre-chamber soot load. By operating in the pre-chamber heating mode at regular intervals, the pre-chamber components (e.g., spark plug, air injector, and/or fuel injector) may experience a lower level of fouling and degradation, and thus may undergo less maintenance.

At 318, method 300 includes discontinuing pre-chamber operation during the exhaust stroke. For example, an air-fuel mixture may not be delivered to and combusted in the pre-chamber during the exhaust stroke. For example, the fuel injector may not inject fuel during the exhaust stroke, the air injector may not inject air during the exhaust stroke, and the spark plug may not actuate during the exhaust stroke. Further, the controller may adjust the pulse-width of the signal to the exhaust valve timing actuator to open the exhaust valve for a nominal amount of time. The controller may also adjust the pulse-width of the signal to the intake valve timing actuator to return the intake valve to nominal timing, for example. Method 300 then ends. As one example, method 300 may be repeated at a pre-determined frequency (e.g., based on the fouling counter) so that fouling of pre-chamber surfaces may be mitigated.

In this way, a pre-chamber of a cylinder may be operated in a pre-chamber heating mode, where the pre-chamber operates during an exhaust stroke of a corresponding cylinder. Operating the pre-chamber during the exhaust stroke may increase a pre-chamber temperature, which may cause a reduction in a pre-chamber soot load. For example, an increase in the pre-chamber temperature may decrease a spark plug soot load (e.g., an amount of build-up on a spark plug of the pre-chamber). Additionally or alternatively, the increase in the pre-chamber temperature may decrease a soot load of pre-chamber walls. Reducing build-up in the pre-chamber (e.g., reducing the pre-chamber soot load) by operating in the pre-chamber heating mode may mitigate pre-chamber ignition issues such a pre-chamber misfire, which may increase vehicle fuel efficiency and reduce maintenance costs relative to systems without the pre-chamber heating mode.

Turning now to FIG. 4, an exemplary timing chart 400 of a cylinder operating in the pre-chamber heating mode is shown. The cylinder may be cylinder 130 of engine 10 in FIG. 1, for example, and may include a pre-chamber ignition system (e.g., pre-chamber 138 of FIG. 1). Timing chart 400 shows one combustion cycle, wherein the combustion cycle (e.g., a cylinder cycle) refers to four strokes of an engine cycle within a cylinder. A piston position relative to top dead center (TDC), bottom dead center (BDC), and the four strokes of the combustion cycle (intake, compression, power, and exhaust) is shown in plot 402. Further, a pre-chamber fuel injection signal is shown in plot 404, a pre-chamber air injection signal is shown in plot 406, a spark plug actuation signal is shown in plot 408, and a cylinder fuel injection signal is shown in plot 410. For all of the above, the horizontal axis represents engine position (e.g., in crank angle degrees), with the crank angle degrees (CAD) increasing from left to right. The vertical axis represents each labeled parameters. For plot 402, the vertical axis shows the piston position relative to TDC. For each of plots 404, 406, 408, and 410, an increase in a magnitude of the parameter above zero indicates actuation of the corresponding injector or spark plug. Further, the stroke of the combustion cycle is indicated at the top of timing chart 400, the power stroke corresponding to the interval from 0 CAD to 180 CAD, the exhaust stroke corresponding to the interval from 180 CAD to 360 CAD, the intake stroke corresponding to the interval from 360 CAD to 540 CAD, and the compression stroke corresponding to the interval from 540 CAD to 720 CAD.

During the intake stroke, the exhaust valves close and the intake valves open (not shown). Air is introduced into the cylinder via the intake manifold and one or more intake ports, and the piston (plot 402) moves to the bottom of the cylinder so as to increase the volume within the cylinder. The position at which the piston is at its bottom-most position in the cylinder and at the end of its stroke (e.g., when the combustion chamber is at its largest volume) is typically referred to as BDC. During the compression stroke, the intake valves and the exhaust valves are closed. The piston (plot 402) moves toward the cylinder head so as to compress the air within the cylinder. The point at which the piston is at the end of its stroke and closest to the cylinder head (e.g., when the combustion chamber is at its smallest volume) is typically referred to as TDC. During the compression stroke, as the piston moves towards TDC, fuel is introduced into the cylinder (plot 410) via a cylinder fuel injector (e.g., cylinder fuel injector 66 of FIG. 1), forming an air-fuel mixture with the air inducted into the cylinder during the intake stroke. Fuel is also injected into the pre-chamber (plot 404) via a pre-chamber fuel injector (e.g., pre-chamber fuel injector 96 of FIG. 1), and air is injected into the pre-chamber (plot 406) via a pre-chamber air injector (e.g., air injector 94 of FIG. 1) to produce an air-fuel mixture in the pre-chamber. In a process herein referred to as ignition, the air-fuel mixture in the pre-chamber is ignited via a spark from a spark plug coupled to the pre-chamber (plot 408) (e.g., spark plug 92 of FIG. 1), resulting in pre-chamber combustion. For example, the spark plug may be actuated shortly before TDC of the compression stroke and after the pre-chamber air injection, the pre-chamber fuel injection, and the cylinder fuel injection have occurred. As the air-fuel mixture in the pre-chamber combusts, jets of flame and hot air flow from the pre-chamber to the cylinder via holes in walls of the pre-chamber, and the jets of flame and hot air ignite the air-fuel mixture in the cylinder. During the power stroke, the expanding gases in the cylinder push the piston (plot 402) back down to BDC. A crankshaft (e.g., crankshaft 140 shown in FIG. 1) converts this piston movement into a rotational torque of the rotary shaft. During the exhaust stroke, the exhaust valves are opened to release the combusted air-fuel mixtures to the corresponding exhaust passages, and the piston returns to TDC.

While operating in the pre-chamber heating mode, an additional combustion event occurs in the pre-chamber during the exhaust stroke to increase pre-chamber temperatures and reduce a soot load of the pre-chamber. When the piston is positioned at 180 CAD (e.g., the beginning of the exhaust stroke), for example, pre-chamber fuel (plot 404) and pre-chamber air (plot 406) are both injected into the pre-chamber. After injection, the spark plug is actuated (e.g., around 270 CAD). In other examples, pre-chamber fuel injection, pre-chamber air injection, and spark plug actuation may occur at different piston positions. Actuating the spark plug combusts the air-fuel mixture in the pre-chamber, causing an additional combustion event. The heat generated in the pre-chamber during the additional combustion event may burn away an amount of soot in the pre-chamber. After combustion in the pre-chamber, hot exhaust gases flow out of the pre-chamber and into the cylinder, where they may be partially purged by the exhaust stroke. However, since no fuel is injected into the cylinder during the exhaust stroke (plot 410), an additional combustion event does not occur in the cylinder during the exhaust stroke. Further, pre-chamber soot load may be decreased over a plurality of combustion cycles.

Turning now to FIG. 5, a prophetic example timeline 500 of an engine operating in a pre-chamber heating mode is shown. The engine may be engine 10 in FIG. 1, for example, and may include an exhaust gas temperature sensor (e.g., exhaust gas temperature sensor 158). Although some parameters are shown for a single cylinder in FIG. 5, it may be understood that the cylinder may be included in a multi-cylinder engine system. The cylinder may be cylinder 130 shown in FIG. 1, for example, and may include a pre-chamber as an ignition source (e.g., pre-chamber 138 of FIG. 1). A fouling counter (e.g., a counter by which a controller tracks a time duration or number of engine cycles elapsed since a last pre-chamber heating mode) is shown in plot 502, an indication of whether the engine is operating in a pre-chamber heating mode is shown in plot 504, a spark plug soot load of a spark plug of the pre-chamber (e.g., a determined amount of soot on the spark plug) is shown in plot 506, a spark plug tip temperature (e.g., an estimated or measured temperature at the tip of the spark plug of the pre-chamber) is shown in plot 508, and an exhaust gas temperature is shown in plot 510. Further, a threshold count for the fouling counter is shown by dashed line 512, an upper threshold spark plug soot load is shown by dashed line 514, a lower threshold spark plug soot load is shown by dashed line 516, a first threshold exhaust gas temperature is shown by dashed line 518, and a second threshold exhaust gas temperature is shown by dashed line 520. For all of the above, the horizontal axis represents time, with time increasing along the horizontal axis from left to right. The vertical axis represents each labeled parameter. For each of plots 502, 506, 508, and 510, a magnitude of the parameter increases up the vertical axis. For plot 504, the vertical axis shows whether the engine is operating in the pre-chamber heating mode ("yes") or not ("no").

At time t0, the fouling counter (plot 502) is below the threshold count, and the spark plug soot load (plot 506) is below the upper threshold soot load (dashed line 514). Therefore, the engine is not operated in the pre-chamber heating mode (plot 504). In the example of timeline 500, the engine is operating in a nominal mode where engine operating parameters, including cylinder fueling, ignition timing, engine speed, and engine load, are adjusted to meet an engine torque demand (e.g., a driver-demanded torque). Further, the exhaust gas temperature (plot 510) is below the first upper threshold exhaust gas temperature (dashed line 518). While operating in the nominal mode, a pre-chamber combustion event occurs only during a compression stroke, as described above with respect to FIG. 4, such that jets of hot gas and flame ignite an air-fuel mixture in the cylinder to produce torque.

Just prior to time t1, the spark plug soot load (plot 506) exceeds the upper threshold soot load (dashed line 514). Further, at time t1, the fouling counter (plot 502) exceeds the threshold counter (dashed line 512), and the exhaust gas temperature (plot 510) is below the first threshold exhaust gas temperature. The first threshold exhaust gas temperature may be a temperature above which operating in the pre-chamber heating mode may increase the exhaust gas temperature above a degradation temperature of an exhaust system component (e.g., emission control device 178 of FIG. 1), for example. Thus, in response to the fouling counter (plot 502) exceeding the threshold counter (dashed line 512), the spark plug soot load (plot 506) exceeding the upper threshold soot load (dashed line 514), and the exhaust gas temperature (plot 510) being below the first threshold exhaust gas temperature, entry conditions for operating in the pre-chamber heating mode are considered met, and the engine is transitioned into operating in the pre-chamber heating mode (plot 504).

Between time t1 and time t2, the engine operates in the pre-chamber heating mode, as demonstrated by plot 504. While operating in the pre-chamber heating mode, an additional combustion event is commanded in the exhaust stroke of the cylinder. The pre-chamber may be operated according to the timing chart of FIG. 4, such that two pre-chamber combustion events occur in each cylinder combustion cycle. During this interval, additional combustion events increase the spark plug tip temperature (plot 508), which causes build-up in the pre-chamber, such as soot build-up on the spark plug, to burn off, thus decreasing the spark plug soot load (plot 506) below the upper threshold soot load (dashed line 514). Further, the additional combustion events in the pre-chamber generate additional heat in the exhaust system. As a result, the exhaust gas temperature (plot 510) increases between t1 and t2. As shown in FIG. 5, the exhaust gas temperature does not exceed the second threshold exhaust gas temperature (dashed line 520). The second threshold exhaust gas temperature is a temperature above which one or more exhaust components may experience degradation. For example, the second threshold exhaust gas temperature may be the degradation temperature threshold of the emission control device.

Just before time t2, the spark plug soot load (plot 506) decreases below the lower threshold spark plug soot load (dashed line 516), which may be a non-zero threshold soot load below which spark plug cleaning in the pre-chamber heating mode is determined to be complete. Thus, at time t2, the engine is transitioned out of operating in the pre-chamber heating mode (plot 504). As a result, additional pre-chamber combustion events in the exhaust stroke are not requested, while pre-chamber combustion continues during the compression stroke. Further, at time t2, the exhaust gas temperature (plot 510) remains below the second threshold exhaust gas temperature (dashed line 520). Further still, the fouling counter (plot 502) is to zero upon transitioning out of the pre-chamber heating mode. Thus, after operating in the pre-chamber heating mode between t1 and t2, the spark plug soot load is reduced (e.g., spark plug fouling is reduced) without the exhaust gas temperature increasing above the second threshold exhaust gas temperature.

After time t2, the engine operates in a nominal operating mode, and the fouling counter (plot 502) increases linearly with time, the spark plug soot load (plot 506) also increases over time. Further, the spark plug tip temperature (plot 508) and the exhaust gas temperature (plot 510) both decreases, as the pre-chamber is no longer undergoing additional combustion in the exhaust stroke. In some examples, other engine operating conditions may cause the spark plug tip temperature and/or the exhaust gas temperature to increase during the nominal operating mode. For example, a driver torque demand may increase the engine load, which may increase exhaust gas temperatures. As another example, a lean commanded AFR may increase exhaust gas temperatures during the nominal operating mode.

In this way, an engine with a pre-chamber ignition system may be operated in a pre-chamber heating mode to increase a temperature of a pre-chamber. Operating in the pre-chamber heating mode may include performing an additional combustion event in a pre-chamber of one or more cylinders during an exhaust stroke of the cylinder(s). In some examples, the engine may be operated in the pre-chamber heating mode to reduce fouling of pre-chamber surfaces, such as a pre-chamber spark plug, a pre-chamber air injector, a pre-chamber wall, and/or a pre-chamber fuel injector. By increasing the temperature of the pre-chamber, a soot load of pre-chamber the surfaces, such as a spark plug soot load, may be decreased by burning off accumulated soot from the pre-chamber surfaces. By periodically operating in the pre-chamber heating mode and reducing the soot load of pre-chamber surfaces before the fouling degrades pre-chamber ignition system operation, an occurrence of misfire due to pre-chamber surface fouling may be reduced, which may increase engine performance. Further, by reducing the soot load of the pre-chamber surfaces (e.g., reducing pre-chamber fouling), engine maintenance and component degradation may be reduced, which may increase customer satisfaction. Further still, the engine may be operated in the pre-chamber heating mode to increase an efficiency of pre-chamber operation. By increasing the temperature of the pre-chamber, fuel vaporization, air and fuel mixing, and/or ignition efficiency may be increased, which may increase engine performance.

The technical effect of igniting an air-fuel mixture in the pre-chamber during an exhaust stroke is that a pre-chamber temperature is increased, reducing a soot load of one or more pre-chamber surfaces, such as a spark plug tip and/or an injector tip.

As one example, a method, comprises: combusting a first air-fuel mixture in a pre-chamber of a cylinder during an exhaust stroke of the cylinder responsive to fouling of the pre-chamber. In the preceding example, the method additionally or optionally further comprises combusting a second air-fuel mixture in the pre-chamber during a compression stroke of the cylinder to ignite a third air-fuel mixture within the cylinder. In one or both of the preceding examples, additionally or optionally, combusting the first air-fuel mixture in the pre-chamber of the cylinder during the exhaust stroke of the cylinder includes: during the exhaust stroke of the cylinder, delivering air for the first air-fuel mixture via a pre-chamber air injector; delivering fuel for the first air-fuel mixture via a pre-chamber fuel injector; and igniting the first air-fuel mixture via a pre-chamber spark plug. In any or all of the preceding examples, additionally or optionally, the fouling of the pre-chamber is indicated responsive to a soot load of the pre-chamber exceeding an upper threshold soot load, and the method further comprises: responsive to the soot load of the pre-chamber decreasing below a lower threshold soot load, discontinuing combusting the first air-fuel mixture in the pre-chamber of the cylinder during the exhaust stroke of the cylinder, including not delivering fuel to the pre-chamber during the exhaust stroke of the cylinder. In any or all of the preceding examples, additionally or optionally, the soot load is a determined soot load of one of the pre-chamber air injector, the pre-chamber fuel injector, and the pre-chamber spark plug. In any or all of the preceding examples, additionally or optionally, combusting the first air-fuel mixture in the pre-chamber of the cylinder during the exhaust stroke of the cylinder comprises operating in a pre-chamber heating mode, and the fouling of the pre-chamber is indicated responsive to a first threshold duration elapsing since last operating the pre-chamber in the pre-chamber heating mode. In any or all of the preceding examples, the method additionally or optionally further comprises, responsive to operating the pre-chamber in the pre-chamber heating mode for a second threshold duration, less than the first threshold duration, discontinuing operating the pre-chamber in the pre-chamber heating mode, including not delivering fuel to the pre-chamber during the exhaust stroke of the cylinder. In any or all of the preceding examples, the method additionally or optionally further comprises adjusting at least one of a cylinder intake valve timing and a cylinder exhaust valve timing responsive to combusting the first air-fuel mixture in the pre-chamber of the cylinder. In any or all of the preceding examples, additionally or optionally, adjusting at least one of the cylinder intake valve timing and the cylinder exhaust valve timing includes at least one of advancing an opening timing of the cylinder intake valve and retarding an opening timing of the cylinder exhaust valve.

As another example, a method for an engine comprises: responsive to a request for pre-chamber heating, combusting an air-fuel mixture in a pre-chamber of a cylinder while the cylinder is unfueled and the engine is at one or more of a desired engine position and a desired engine speed. In the preceding example, additionally or optionally, the request for pre-chamber heating is responsive to one or more of an indication of pre-chamber fouling and a request for increased pre-chamber efficiency. In one or both of the preceding examples, additionally or optionally, the indication of pre-chamber fouling is based on a soot load of the pre-chamber exceeding an upper threshold soot load of the pre-chamber. In any or all of the preceding examples, additionally or optionally, the request for pre-chamber heating is responsive to a cold start condition. In any or all of the preceding examples, the method additionally or optionally further comprises motoring the engine with an electric machine during the cold start condition, and wherein the desired engine speed is a positive, non-zero speed while motoring the engine, and the desired engine position is determined based on a relationship between engine position and cylinder valve lift. In any or all of the preceding examples, additionally or optionally, the desired engine speed is zero during the cold start condition.

As another example, a system comprises: an engine including a plurality of cylinders, each cylinder including a pre-chamber of a pre-chamber ignition system; and a controller storing executable instructions in non-transitory memory that, when executed, cause the controller to: operate in a pre-chamber ignition mode to initiate combustion in each cylinder of the engine via the corresponding pre-chamber; and operate in a pre-chamber heating mode while also operating in the pre-chamber ignition mode responsive to at least one of an indication of pre-chamber fouling and a request for increased pre-chamber efficiency. In the preceding example, additionally or optionally, each pre-chamber includes a spark plug, and to operate in the pre-chamber heating mode while also operating in the pre-chamber ignition mode, the controller includes further instructions stored in non-transitory memory that, when executed, cause the controller to: during a compression stroke of each cylinder, igniting a first air-fuel mixture in the corresponding pre-chamber via a spark plug to initiate combustion in the cylinder; and during an exhaust stroke of each cylinder, igniting a second air-fuel mixture in the corresponding pre-chamber via the spark plug without initiating combustion in the cylinder. In one or both of the preceding examples, additionally or optionally, each pre-chamber of the pre-chamber ignition system includes an air injector, a fuel injector, and a spark plug, and to operate in the pre-chamber heating mode while also operating in the pre-chamber ignition mode, the controller includes further instructions stored in non-transitory memory that, when executed, cause the controller to: during the compression stroke of each cylinder, deliver the first air-fuel mixture to the pre-chamber by injecting a first amount of air into the pre-chamber via the air injector and a first amount of fuel into the pre-chamber via the fuel injector; and during the exhaust stroke of each cylinder, deliver the second air-fuel mixture to the pre-chamber by injecting a second amount air into the pre-chamber via the air injector and injecting a second amount of fuel into the pre-chamber via the fuel injector. In any or all of the preceding examples, additionally or optionally, the indication of pre-chamber fouling includes at least one of a soot load of the pre-chamber being greater than a threshold soot load and a number of engine cycles since operating in the pre-chamber heating mode exceeding a threshold. In any or all of the preceding examples, additionally or optionally, request for increased pre-chamber efficiency includes the load of the engine being less than a threshold load.

In another representation, a method comprises: performing exhaust stroke combustion in a pre-chamber of an engine responsive to conditions for operating in a pre-chamber heating mode being met; and adjusting parameters for the exhaust stroke combustion in the pre-chamber based on whether the engine is in a pre-delivery state or a post-delivery state. In the preceding example, additionally or optionally, conditions for operating in the pre-chamber heating mode include a soot load of the pre-chamber being greater than a threshold soot load, and adjusting the parameters for the exhaust stroke combustion in the pre-chamber based on whether the engine is in the pre-delivery state or the post-delivery state includes increasing the threshold soot load when the engine is in the post-delivery state relative to the pre-delivery state. In one or both of the preceding examples, additionally or optionally, conditions for operating in the pre-chamber heating mode include a fouling counter reaching a threshold count, and adjusting the parameters for the exhaust stroke combustion in the pre-chamber based on whether the engine is in the pre-delivery state or the post-delivery state includes increasing the threshold count when the engine is in the post-delivery state relative to the pre-delivery state. In any or all of the preceding examples, additionally or optionally, conditions for operating in the pre-chamber heating mode include a temperature of the pre-chamber being less than a threshold temperature, and adjusting the parameters for the exhaust stroke combustion in the pre-chamber based on whether the engine is in the pre-delivery state or the post-delivery state includes increasing the threshold temperature when the engine is in the post-delivery state relative to the pre-delivery state. In any or all of the preceding example, additionally or optionally, adjusting the parameters for the exhaust stroke combustion in the pre-chamber based on whether the engine is in the pre-delivery state or the post-delivery state includes further retarding an exhaust valve opening timing when the engine is in the pre-delivery state than when the engine is in the post-delivery state.

In yet another representation, a method for an engine comprises: performing exhaust stroke combustion in a pre-chamber of a cylinder; and adjusting one or more operating parameters of the cylinder while performing the exhaust stroke combustion in the pre-chamber. In the preceding example, additionally or optionally, performing the exhaust stroke combustion in the pre-chamber of the cylinder includes, during an exhaust stroke of the cylinder, injecting air into the pre-chamber via a pre-chamber air injector, injecting fuel into the pre-chamber via a pre-chamber fuel injector, and igniting the injected air and fuel via a pre-chamber spark plug. In one or both of the preceding examples, additionally or optionally, performing the exhaust stroke combustion in the pre-chamber of the cylinder is responsive to fouling of at least one of the pre-chamber air injector, the pre-chamber fuel injector, and the pre-chamber spark plug. In any or all of the preceding examples, additionally or optionally, performing the exhaust stroke combustion in the pre-chamber of the cylinder is responsive to a request for an increased temperature in the pre-chamber. In any or all of the preceding examples, additionally or optionally, the one or more operating parameters of the cylinder include an intake valve opening timing, an exhaust valve opening timing, and a cylinder fuel injection amount. In any or all of the preceding examples, additionally or optionally, adjusting the one or more operating parameters of the cylinder includes retarding an exhaust valve opening timing, and wherein the exhaust valve opening timing is further retarded when the engine is in a pre-delivery state than when the engine is in a post-delivery state.

In still another representation, a method for an engine comprises: responsive to a cold start condition, combusting an air-fuel mixture in a pre-chamber of a cylinder while every cylinder of the engine is unfueled. In the preceding example, additionally or optionally, combusting the air-fuel mixture in the pre-chamber of the cylinder includes injecting air into the pre-chamber via a pre-chamber air injector, injecting fuel into the pre-chamber via a pre-chamber fuel injector, and igniting the injected air and fuel via a pre-chamber spark plug. In one or both of the preceding examples, additionally or optionally, the cold start condition is based on one or more of a temperature of the engine below a first threshold temperature of the engine and an amount of time after an engine start less than a threshold amount of time after the engine start. In any or all of the preceding examples, the method additionally or optionally further comprises, responsive to a temperature of the engine exceeding a second threshold temperature of the engine, fueling every cylinder of the engine.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
   combusting a first air-fuel mixture in a pre-chamber of a cylinder during an exhaust stroke of the cylinder responsive to fouling of the pre-chamber, wherein combusting the first air-fuel mixture in the pre-chamber of the cylinder during the exhaust stroke of the cylinder comprises operating in a pre-chamber heating mode, and the fouling of the pre-chamber is indicated responsive to a first threshold duration elapsing since last operating the pre-chamber in the pre-chamber heating mode.

2. The method of claim 1, further comprising:
   combusting a second air-fuel mixture in the pre-chamber during a compression stroke of the cylinder to ignite a third air-fuel mixture within the cylinder.

3. The method of claim 1, wherein combusting the first air-fuel mixture in the pre-chamber of the cylinder during the exhaust stroke of the cylinder includes:
   during the exhaust stroke of the cylinder,
      delivering air for the first air-fuel mixture via a pre-chamber air injector;
      delivering fuel for the first air-fuel mixture via a pre-chamber fuel injector; and
      igniting the first air-fuel mixture via a pre-chamber spark plug.

4. The method of claim 3, wherein the fouling of the pre-chamber is indicated responsive to a soot load of the pre-chamber exceeding an upper threshold soot load, and the method further comprises:
   responsive to the soot load of the pre-chamber decreasing below a lower threshold soot load, discontinuing combusting the first air-fuel mixture in the pre-chamber of the cylinder during the exhaust stroke of the cylinder, including not delivering fuel to the pre-chamber during the exhaust stroke of the cylinder.

5. The method of claim 4, wherein the soot load is a determined soot load of one of the pre-chamber air injector, the pre-chamber fuel injector, and the pre-chamber spark plug.

6. The method of claim 1, further comprising:
   responsive to operating the pre-chamber in the pre-chamber heating mode for a second threshold duration, less than the first threshold duration, discontinuing operating the pre-chamber in the pre-chamber heating mode, including not delivering fuel to the pre-chamber during the exhaust stroke of the cylinder.

7. The method of claim 1, further comprising adjusting at least one of a cylinder intake valve timing and a cylinder exhaust valve timing responsive to combusting the first air-fuel mixture in the pre-chamber of the cylinder.

8. The method of claim 7, wherein adjusting at least one of the cylinder intake valve timing and the cylinder exhaust valve timing includes at least one of advancing an opening timing of the cylinder intake valve and retarding an opening timing of the cylinder exhaust valve.

\* \* \* \* \*